(12) United States Patent
Todd et al.

(10) Patent No.: US 10,710,455 B2
(45) Date of Patent: Jul. 14, 2020

(54) SYSTEMS AND METHODS FOR CONTROLLING VEHICLE IGNITION USING BIOMETRIC DATA

(71) Applicant: AUTOMOTIVE COALITION FOR TRAFFIC SAFETY, INC., Washington, DC (US)

(72) Inventors: Gilbert A. Todd, Clawson, MI (US); Chakravarthi M. Nagolu, Auburn Hills, MI (US)

(73) Assignee: Automotive Coalition For Traffic Safety, Washington, DC (US)

(*) Notice: Subject to any disclaimer, the term of this patent is extended or adjusted under 35 U.S.C. 154(b) by 0 days.

(21) Appl. No.: 14/315,631

(22) Filed: Jun. 26, 2014

(65) Prior Publication Data

US 2015/0066238 A1    Mar. 5, 2015

Related U.S. Application Data

(60) Provisional application No. 61/870,384, filed on Aug. 27, 2013.

(51) Int. Cl.
*B60K 28/06* (2006.01)
*B60R 25/25* (2013.01)
*B60R 25/045* (2013.01)

(52) U.S. Cl.
CPC .......... *B60K 28/063* (2013.01); *B60K 28/066* (2013.01); *B60R 25/045* (2013.01); *B60R 25/252* (2013.01)

(58) Field of Classification Search
CPC .. B60K 28/063; B60K 28/066; B60R 25/045; B60R 25/252; G06K 9/03; G06K 9/036;
(Continued)

(56) References Cited

U.S. PATENT DOCUMENTS 3,283,563 A   11/1966 Turner et al.
3,301,482 A    1/1967 Bullen
(Continued)

FOREIGN PATENT DOCUMENTS

CN    2001-57440    2/2001
CN      1586944    3/2005
(Continued)

OTHER PUBLICATIONS

International Search Report PCT/US2014/044350 dated Oct. 10, 2014.
(Continued)

*Primary Examiner* — Angelina Shudy
(74) *Attorney, Agent, or Firm* — Pandiscio & Pandiscio

(57) ABSTRACT

A push-to-start ignition device measures biometric information of a driver to control activation of vehicle ignition. The push-to-start switch includes a touchpad that senses, using capacitive sensors, a vehicle driver's finger and provides signals using one or a combination of lights, audio, and haptic feedback to guide the vehicle driver into a suitable position for measuring the biometric characteristic. If the biometric measurement meets a predefined threshold, the vehicle ignition is activated. If the biometric measurement fails to meet a predefined threshold, the vehicle ignition is locked.

21 Claims, 6 Drawing Sheets

(58) Field of Classification Search
CPC .............. G06K 9/0002; G07C 9/00563; G07C 9/00158
USPC ........................................................ 701/1, 36
See application file for complete search history.

(56) References Cited

U.S. PATENT DOCUMENTS

| | | | |
|---|---|---|---|
| 3,792,351 A | 2/1974 | Ireland | |
| 3,897,659 A | 8/1975 | Henry | |
| 4,090,078 A | 5/1978 | Heim | |
| 4,290,052 A * | 9/1981 | Eichelberger | G06F 3/044 341/33 |
| 4,535,620 A | 8/1985 | Cunningham | |
| 4,678,057 A | 7/1987 | Elfman | |
| 4,749,553 A | 6/1988 | Lopez et al. | |
| 4,843,377 A | 6/1989 | Fuller et al. | |
| 4,868,545 A | 9/1989 | Jones | |
| 4,916,435 A | 4/1990 | Fuller et al. | |
| 4,975,581 A | 12/1990 | Robinson et al. | |
| 5,006,315 A | 4/1991 | Maroulis et al. | |
| 5,303,575 A | 4/1994 | Brown et al. | |
| 5,325,442 A | 6/1994 | Knapp | |
| 5,426,415 A | 6/1995 | Prachar et al. | |
| 5,544,276 A | 8/1996 | Loux et al. | |
| 5,652,398 A | 7/1997 | Johnson | |
| 5,655,530 A | 8/1997 | Messerschmidt | |
| 5,746,973 A | 5/1998 | Naraghi | |
| 5,823,951 A | 10/1998 | Messerschmidt | |
| 5,830,112 A | 11/1998 | Wang et al. | |
| 5,877,345 A | 3/1999 | Bauer et al. | |
| 5,955,886 A | 9/1999 | Cohen et al. | |
| 6,129,680 A | 10/2000 | Mottram | |
| 6,152,876 A | 11/2000 | Robinson et al. | |
| 6,157,041 A | 12/2000 | Thomas et al. | |
| 6,229,908 B1 * | 5/2001 | Edmonds et al. ............ 382/124 | |
| 6,240,306 B1 | 5/2001 | Rohrscheib et al. | |
| 6,266,353 B1 | 7/2001 | Freitas et al. | |
| 6,441,388 B1 | 8/2002 | Thomas et al. | |
| 6,528,809 B1 | 3/2003 | Thomas et al. | |
| 6,622,032 B1 | 9/2003 | Robinson et al. | |
| 6,684,099 B2 | 1/2004 | Ridder et al. | |
| 6,794,988 B1 * | 9/2004 | Weiss et al. ................. 340/553 | |
| 6,862,091 B2 | 3/2005 | Johnson | |
| 6,983,176 B2 | 1/2006 | Gardner et al. | |
| 7,016,713 B2 | 3/2006 | Gardner et al. | |
| 7,092,832 B2 | 8/2006 | Brown | |
| 7,098,037 B2 | 8/2006 | Haas et al. | |
| 7,173,524 B2 * | 2/2007 | Ponziani | B60Q 1/40 340/475 |
| 7,202,091 B2 | 4/2007 | Jones et al. | |
| 7,239,227 B1 * | 7/2007 | Gupta | B60R 25/25 340/5.81 |
| 7,386,152 B2 | 6/2008 | Rowe et al. | |
| 7,446,878 B2 | 11/2008 | Ridder et al. | |
| 7,616,123 B2 | 11/2009 | Ridder et al. | |
| 7,764,982 B2 * | 7/2010 | Dalke | A61B 5/14552 600/310 |
| 7,848,605 B2 | 12/2010 | Ridder et al. | |
| 7,890,158 B2 | 2/2011 | Rowe et al. | |
| 8,095,193 B2 * | 1/2012 | Ridder | A61B 5/0059 340/573.1 |
| 8,174,394 B2 * | 5/2012 | Ridder | A61B 5/0075 340/573.1 |
| 8,306,595 B2 * | 11/2012 | Osaki et al. ................... 600/322 | |
| 8,469,134 B2 | 6/2013 | Osaki et al. | |
| 8,479,864 B2 | 7/2013 | White et al. | |
| 8,605,959 B2 * | 12/2013 | Kangas | G06F 21/316 382/124 |
| 8,773,390 B1 * | 7/2014 | Clark .......................... 345/174 | |
| 8,977,002 B2 * | 3/2015 | Mercier | G06K 9/00624 382/103 |
| 9,163,718 B2 * | 10/2015 | Nelson | F16H 59/0278 |
| 9,459,221 B2 * | 10/2016 | Matsumoto | A61B 5/6898 |
| 9,636,457 B2 * | 5/2017 | Newberry | A61M 5/1723 |
| 9,642,538 B2 * | 5/2017 | Newberry | A61B 5/02055 |
| 9,642,578 B2 * | 5/2017 | Newberry | A61B 5/7275 |
| 9,671,954 B1 * | 6/2017 | Jaugilas | G06F 3/044 |
| 10,040,349 B2 * | 8/2018 | DeVries | B60K 28/063 |
| 10,099,554 B2 * | 10/2018 | Steeg | G01N 21/27 |
| 10,452,257 B2 * | 10/2019 | Kim | G01S 19/13 |
| 2003/0039299 A1 | 2/2003 | Horovitz | |
| 2003/0048000 A1 * | 3/2003 | Harter et al. ................ 307/10.6 | |
| 2003/0085284 A1 * | 5/2003 | Bremer et al. ............ 235/462.32 | |
| 2003/0204290 A1 * | 10/2003 | Sadler | B60R 25/04 701/1 |
| 2004/0081339 A1 * | 4/2004 | Benkley, III | G06K 9/0002 382/124 |
| 2004/0155752 A1 * | 8/2004 | Radke | G06K 9/00013 340/5.53 |
| 2004/0204868 A1 | 10/2004 | Maynard et al. | |
| 2004/0260194 A1 | 12/2004 | Bayer | |
| 2005/0241871 A1 | 11/2005 | Stewart | |
| 2006/0153740 A1 | 7/2006 | Sultan | |
| 2006/0167349 A1 | 7/2006 | Gardner et al. | |
| 2006/0206034 A1 | 9/2006 | Stock et al. | |
| 2006/0210120 A1 * | 9/2006 | Rowe et al. ................. 382/115 | |
| 2006/0253711 A1 * | 11/2006 | Kallmann ..................... 713/186 | |
| 2006/0285076 A1 | 12/2006 | Takeda et al. | |
| 2007/0080951 A1 * | 4/2007 | Maruyama | G06F 1/1626 345/173 |
| 2007/0142720 A1 | 6/2007 | Ridder et al. | |
| 2007/0144812 A1 | 6/2007 | Stewart et al. | |
| 2007/0245801 A1 | 10/2007 | Stock | |
| 2008/0006077 A1 | 1/2008 | Crabtree et al. | |
| 2008/0045806 A1 * | 2/2008 | Keppler ......................... 600/300 | |
| 2008/0061238 A1 | 3/2008 | Hok et al. | |
| 2008/0107309 A1 * | 5/2008 | Cerni ........................... 382/115 | |
| 2008/0115981 A1 * | 5/2008 | Bechtel | G06F 3/03545 178/19.01 |
| 2008/0171947 A1 | 7/2008 | Ruffert | |
| 2008/0187015 A1 | 8/2008 | Yoshikawa | |
| 2008/0246735 A1 * | 10/2008 | Reynolds | G06F 3/016 345/173 |
| 2008/0252412 A1 * | 10/2008 | Larsson et al. ............... 340/5.2 | |
| 2008/0319286 A1 | 12/2008 | Ridder et al. | |
| 2009/0003764 A1 | 1/2009 | Ridder et al. | |
| 2009/0007634 A1 | 1/2009 | Mitchell | |
| 2009/0248260 A1 * | 10/2009 | Flanagan | F16H 61/24 701/51 |
| 2010/0010325 A1 * | 1/2010 | Ridder | A61B 5/0075 600/310 |
| 2010/0028210 A1 | 2/2010 | Ozaki et al. | |
| 2010/0031718 A1 * | 2/2010 | Heil | B60R 25/04 70/454 |
| 2010/0036592 A1 | 2/2010 | Osaki et al. | |
| 2010/0097198 A1 * | 4/2010 | Suzuki | G06F 3/0416 340/407.2 |
| 2010/0188232 A1 | 7/2010 | Lambert | |
| 2010/0207895 A1 * | 8/2010 | Joung | G06F 3/016 345/173 |
| 2010/0252737 A1 | 10/2010 | Fournel et al. | |
| 2010/0327167 A1 | 12/2010 | Koop et al. | |
| 2011/0178420 A1 | 7/2011 | Ridder et al. | |
| 2011/0205038 A1 * | 8/2011 | Drouin | G06F 3/016 340/407.2 |
| 2011/0283770 A1 | 11/2011 | Hok | |
| 2011/0309932 A1 | 12/2011 | Arringdale et al. | |
| 2012/0050231 A1 * | 3/2012 | Westhues | G06F 3/03545 345/179 |
| 2012/0078473 A1 | 3/2012 | Ridder et al. | |
| 2013/0110311 A1 * | 5/2013 | Ver Steeg | G01N 21/27 701/1 |
| 2013/0179780 A1 * | 7/2013 | Ooka | G06F 3/048 715/708 |
| 2014/0002237 A1 * | 1/2014 | Infante et al. ............... 340/5.32 | |
| 2014/0098304 A1 * | 4/2014 | Kim | G06F 3/044 349/12 |
| 2014/0156149 A1 * | 6/2014 | Feit ................................ 701/49 | |
| 2014/0184957 A1 * | 7/2014 | Satou | G06F 1/169 349/12 |
| 2014/0260537 A1 | 9/2014 | Nash | |

(56) References Cited

U.S. PATENT DOCUMENTS

| | | | | |
|---|---|---|---|---|
| 2014/0318293 | A1* | 10/2014 | Nelson | F16H 59/0278 74/473.3 |
| 2015/0169063 | A1* | 6/2015 | Goto | G06F 3/03547 345/173 |
| 2015/0219620 | A1 | 8/2015 | Hok | |
| 2015/0233897 | A1 | 8/2015 | Hok | |
| 2015/0331508 | A1* | 11/2015 | Nho | G06F 3/0421 345/173 |
| 2016/0224184 | A1* | 8/2016 | Nordback | G06F 3/0418 |
| 2017/0050518 | A1 | 2/2017 | Ver Steeg | |
| 2017/0103327 | A1* | 4/2017 | Penilla | G06N 5/025 |
| 2017/0336903 | A1* | 11/2017 | Rivaud | G06F 3/0416 |
| 2019/0135199 | A1* | 5/2019 | Galan Garcia | G06F 3/044 |

FOREIGN PATENT DOCUMENTS

| | | |
|---|---|---|
| CN | 101194270 | 6/2008 |
| CN | 101548496 A | 9/2009 |
| DE | 198 11 872 | 8/1999 |
| DE | 199 38 064 | 8/2000 |
| DE | 101 57 907 | 6/2003 |
| EP | 0593386 A2 | 4/1994 |
| EP | 0 791 899 | 8/1997 |
| EP | 1688741 | 8/2006 |
| GB | 2431470 | 4/2007 |
| GB | 2442980 | 4/2008 |
| JP | 61-181440 | 8/1986 |
| JP | 10-309268 | 11/1998 |
| JP | 11-104112 | 4/1999 |
| JP | 2001-266133 | 9/2001 |
| JP | 2002-116141 | 4/2002 |
| JP | 2005-227553 | 4/2002 |
| JP | 2003-272463 | 9/2003 |
| JP | 2004-86866 | 3/2004 |
| JP | 2004-117104 | 4/2004 |
| JP | 2005-323892 | 11/2005 |
| JP | 2006-27198 | 2/2006 |
| JP | 2008-203598 | 9/2008 |
| JP | 2008-203774 | 9/2008 |
| JP | 2008-253455 | 10/2008 |
| JP | 2008-291710 | 12/2008 |
| JP | 2008-302915 | 12/2008 |
| JP | 2008-308037 | 12/2008 |
| JP | 2009-526707 | 7/2009 |
| JP | 2012-198648 | 10/2012 |
| WO | WO97/000443 | 1/1997 |
| WO | WO-2001067144 | 9/2001 |
| WO | WO-2004090786 | 10/2004 |
| WO | WO 2006/050513 | 5/2006 |
| WO | WO-2010085716 | 7/2010 |
| WO | WO2012/064252 | 5/2012 |

OTHER PUBLICATIONS

Written Opinion of the International Searching Authority PCT/US2015/044350 dated Oct. 10, 2014.

International Search Report dated Feb. 3, 2014 for PCT/SE2013/050991.

International Search Report dated Jan. 31, 2014, 2014 for PCT/SE2013/050990.

Giebel, Brian M., Thesis and Dissertation, "Advancement and Application of Gas Chromatography Isotope Ratio Mass Spectrometry Techniques for Atmospheric Trace Gas Analysis," Published 2011, 252 total pages.

Talbert, Bruce, et al., "A Study of Regulators for Delivering Gases Containing Low Concentrations of Hydrogen Sulfide," LCGC North America, 22(6):562, 564, 567-568 (Jun. 2004).

Extended European Search Report EP 13 83 1692 dated Jul. 13, 2015.

Extended European Search Report EP 13 83 0956 dated Jul. 13, 2015.

* cited by examiner

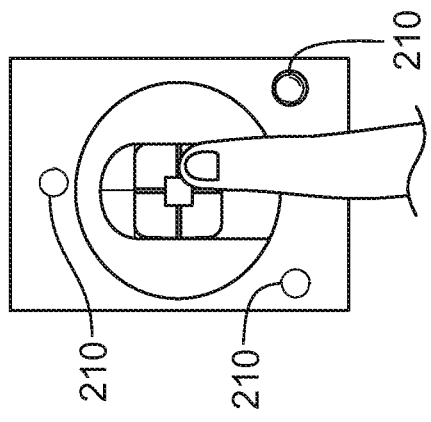
FIG. 2A
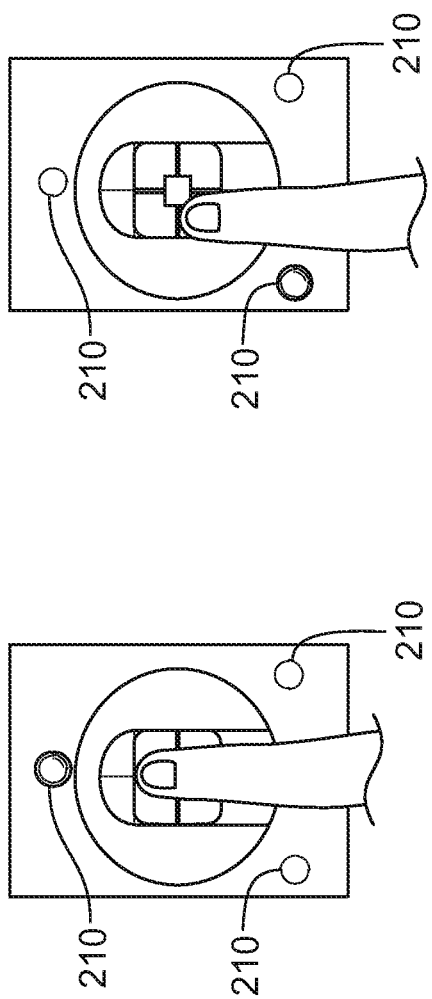
FIG. 2B
FIG. 2C
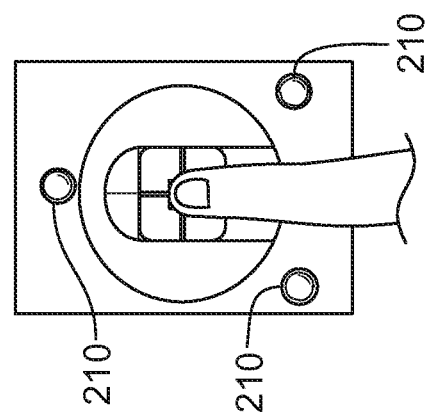
FIG. 2D
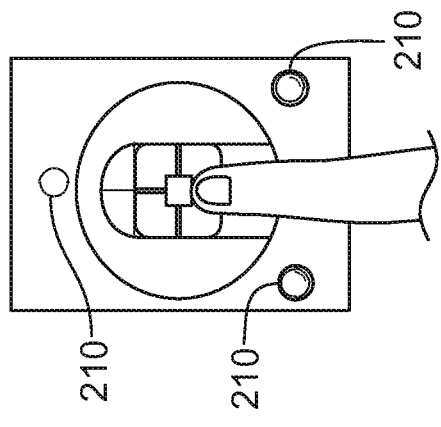
FIG. 2E

SYSTEMS AND METHODS FOR CONTROLLING VEHICLE IGNITION USING BIOMETRIC DATA

CROSS REFERENCE TO RELATED APPLICATIONS

This application claims priority to U.S. Provisional Application Ser. No. 61/870,384 filed Aug. 27, 2013, entitled "Single/Multiple Capacitive Sensors "Push to Start" With LED/Haptic Notification and Measurement Window," the entire contents of which are hereby incorporated by reference.

GOVERNMENT INTERESTS

This invention was made with Government support under contract number DTNH22-08-H-00188 awarded by the National Highway Traffic Safety Administration. The government has certain rights in this invention.

FIELD OF THE INVENTION

This disclosure relates to a push-to-start ignition switch that uses capacitive sensors and biometric data of a vehicle driver to control vehicle ignition.

BACKGROUND OF THE INVENTION

Push button or push-to-start ignition switches are commonly used in vehicles for keyless entry. Such buttons typically work by detecting a key fob within the vehicle and activating a mechanical ignition when pushed by the vehicle driver. Such systems work based on proximity and availability of the key fob. Since any individual could have possession of the key fob, these systems do not prevent unauthorized or unsuitable individuals from starting the vehicle ignition. Accordingly, these systems do not provide any security or safety controls against dangerous drivers.

SUMMARY

Systems and methods are disclosed herein for controlling ignition of a vehicle. A measurement window for measuring biometric characteristics of a vehicle driver includes a capacitive sensor on a touchpad capable of detecting a finger of the vehicle driver. A controller is coupled to the capacitive sensor and configured to provide a signal to the vehicle driver indicative of whether placement of the finger is correct. If the position of the finger is correct, the controller receives a measurement from the measurement window of the biometric characteristic of the vehicle driver. The controller then determines whether the measurement of the biometric characteristic of the vehicle driver meets a predetermined threshold and controls starting the vehicle based on the measurement of the biometric characteristic of the vehicle driver.

In an embodiment, a haptic actuator is coupled to the touchpad and is configured to simulate a push-to-start button when the vehicle starts. Signals provided to the vehicle driver may include haptic feedback, a visual indicator, an audio indicator, or a combination of signals. The signal may indicate different types of placement errors, for example, how vehicle driver placement is in error or how to correct the placement error. In some embodiments, the touchpad includes one or more capacitive sensors. In some embodiments, the touchpad may include one or more ground planes surrounding the capacitive sensor(s). The measurement window may provide optical or spectra measurements and is capable of measuring one or more biometric characteristics including, for example, blood alcohol level.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIGS. 2A-2E are front views of the capacitive push-to-start switch showing examples of finger placement and signals, according to an illustrative embodiment.

DETAILED DESCRIPTION

To provide an overall understanding of the invention, certain illustrative embodiments will now be described, including a capacitive push-to-start switch that includes a measurement window for measuring biometric data of a vehicle driver. It will be understood by one of ordinary skill in the art that the capacitive switch and systems and methods described herein may be adapted and modified as is appropriate for the application being addressed and that the systems and methods described herein may be employed in other suitable applications, and that such other additions and modifications will not depart from the scope thereof.

Push-to-start ignition buttons have been installed in many types of vehicles. Generally speaking, the button is located near the steering wheel in the dashboard of a vehicle, often where a key ignition switch is positioned. The push-to-start buttons are activated by pressing the button and causing a mechanical switch to be activated. Such buttons are controlled by key fobs and may be limited to starting only when the key fob is detected in the proximity of the respective driving seat. Adding additional security limitations to activating an ignition switch is desirable.

It is well known that driving under the influence of alcohol is dangerous and can be illegal at certain blood alcohol levels. Detecting alcohol levels and biometric screening can be extremely important in reducing life-threatening vehicle situations. Combining such screening with an ignition controller would allow only drivers with appropriate biometric data and/or blood alcohol levels to access and start a vehicle. By adding the screening functionality to a push-to-start button also adds the benefit of not taking additional dashboard space which may be limited.

Accordingly, embodiments described herein relate to a push-to-start ignition controller that includes a measurement window for measuring biometric data of a vehicle driver.

Figure 1:
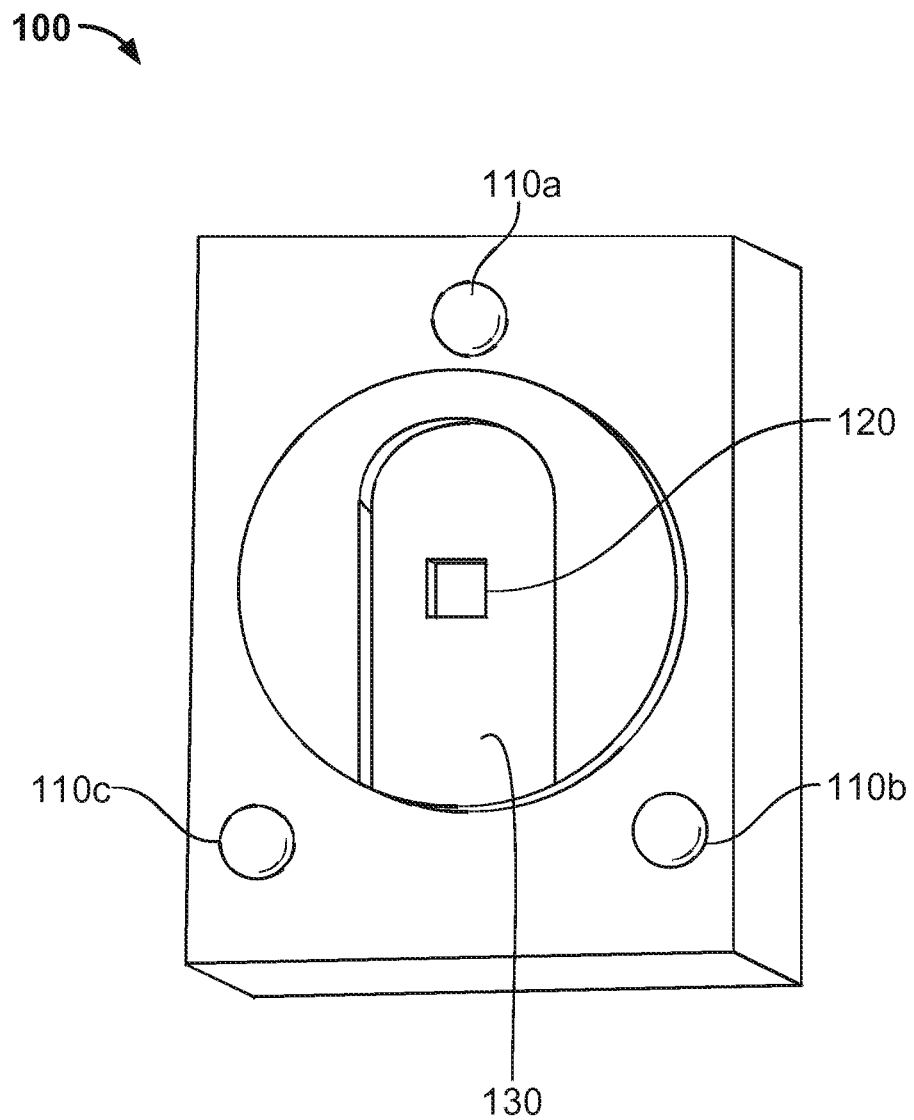
FIG. 1 is a perspective view of a capacitive push-to-start switch, according to an illustrative embodiment.

Turning to FIG. 1, an illustrative embodiment of a capacitive push-to-start switch 100 is shown. In an embodiment, the push-to-start switch may include elements that are familiar to a vehicle driver, for example, a generally rounded shape reminiscent of a key ignition or push button ignition. Text or words may also be included, for example, "engine", "stop", "start" or other words, to provide the driver with information about the status of the vehicle. The push-to-start switch may also include a measurement window 120 and one or more signal indicators 110a-c. The measurement window 120 may be positioned in a touchpad 130 that is generally shaped with contours to conform to a finger. The indicators 110a-c are shown as lights and may be light emitting diode (LED) lights or other lights. Other indicators may also be used.

The push-to-start switch 100 may be mounted on a car dashboard and may be implemented as part of a vehicle manufacturing process, or sold separately as an after-market device. The push-to-start switch 100 may be coupled (not shown) to electrical panels in the vehicle to provide power to the device, as well as to an audio system for the vehicle to provide integrated audio feedback. In some embodiments, the push-to-start switch 100 may include a controller with processor circuitry that is capable of performing methods described herein. In other embodiments, the push-to-start switch 100 may be coupled to processor circuitry in the vehicle that may perform some or all of the methods described herein.

The push-to-start switch 100 described herein includes one or more capacitive sensors positioned surrounding the measurement window. The switch 100 may be a convenience and active safety feature that uses spectrometer analysis for measuring biometric characteristics of a driver. Unlike conventional push button ignition switches, push-to-start switch 100 button is not a mechanical system and instead includes a single or multiple capacitive sensor(s) along a finger imprint.

The capacitive sensor, among other things, may be used to detect the presence of a vehicle driver. In particular, the sensor may detect whether the driver's finger is properly positioned in the contour touchpad 130 so that the measurement window 120 is appropriately covered. Measurement window 120 may provide a screen for a measurement device that is capable of measuring a biometric characteristic of the driver. Some types of measurement devices include a spectrometer, optical sensor and optical device. Some examples of biometric characteristics include fingerprints, spectrometer analysis of the finger to obtain blood alcohol levels, physiological, biochemical or pharmacological analysis, or other characteristics. The capacitive sensors in the touchpad 130 may be used to provide feedback to the driver of whether the driver's finger placement is appropriate. The capacitive sensors may be coupled to a processor (not shown) that activates a signal, for example, the lights 110a-c to show whether the finger placement is correct.

Turning to FIGS. 2A-2E, several examples of visual feedback are shown for an illustrative push-to-start switch. Each of FIGS. 2A-2E depict light indicators 210 surrounding a push-to-start switch touchpad contour in which a finger has been placed. The touchpad area includes one or more capacitive sensors which detect finger placement that is processed by a controller to provide feedback using the light indicators 210 as to whether the finger placement is correct. Correct finger placement is important so that a measurement window in the contoured area (and not visible because it is covered by the finger) can measure the finger. When finger placement is incorrect, the capacitive sensors sense the finger position and cause illuminated signals 210 to appear. In FIG. 2A, the finger placement is too high, as such the top light 210 is illuminated. In FIG. 2B, the finger placement is too far to the left, which causes the light 210 on the left side to be illuminated. FIG. 2C shows the opposite problem, that the finger is too far to the right side, and so the light 210 on the right side is illuminated. FIG. 2D shows that the finger is too low, but centered, so the lower lights 210 are both illuminated. In FIG. 2E the finger is in the correct position so all of the lights 210 are illuminated.

As would be understood by one of skill in the art, other types of signals and indicators could be used. Some examples of signals or indicators include: lights showing the direction in which to move the finger, audio feedback giving verbal cues, haptic feedback, for example providing a vibration or movement to nudge the finger in a particular direction, different types of lights—flashing, strobing, rotating, colors, or other signal.

Although not shown, the push-to-start switch may be coupled to a haptic actuator that can provide positional feedback as well as a simulation of a push button start. The haptic actuator is activated by a processor based on information received from the capacitive sensors to provide tactile sensations to a finger touching a touchpad, for example, by causing electrical vibrations under the capacitive sensor.

Feedback signals may also be given to a driver to indicate that a measurement has been completed or that it is incomplete and needs to be redone. Such feedback may also be one or a combination of lights, audio feedback and haptic feedback.

Figure 3A:
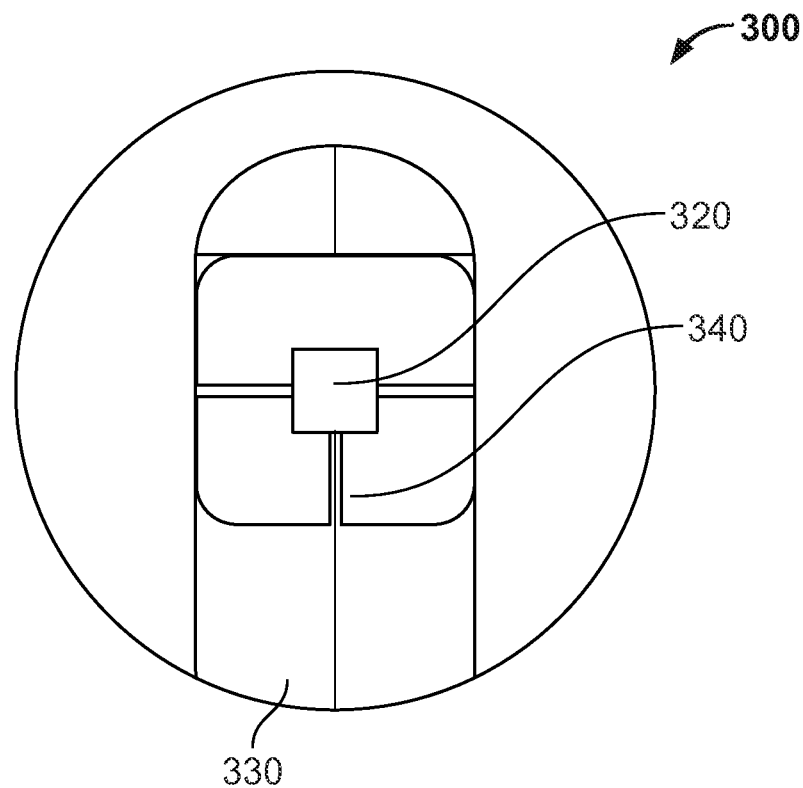
FIG. 3A is a front view of capacitive sensors for a capacitive push-to-start switch, according to an illustrative embodiment.
Figure 3B:
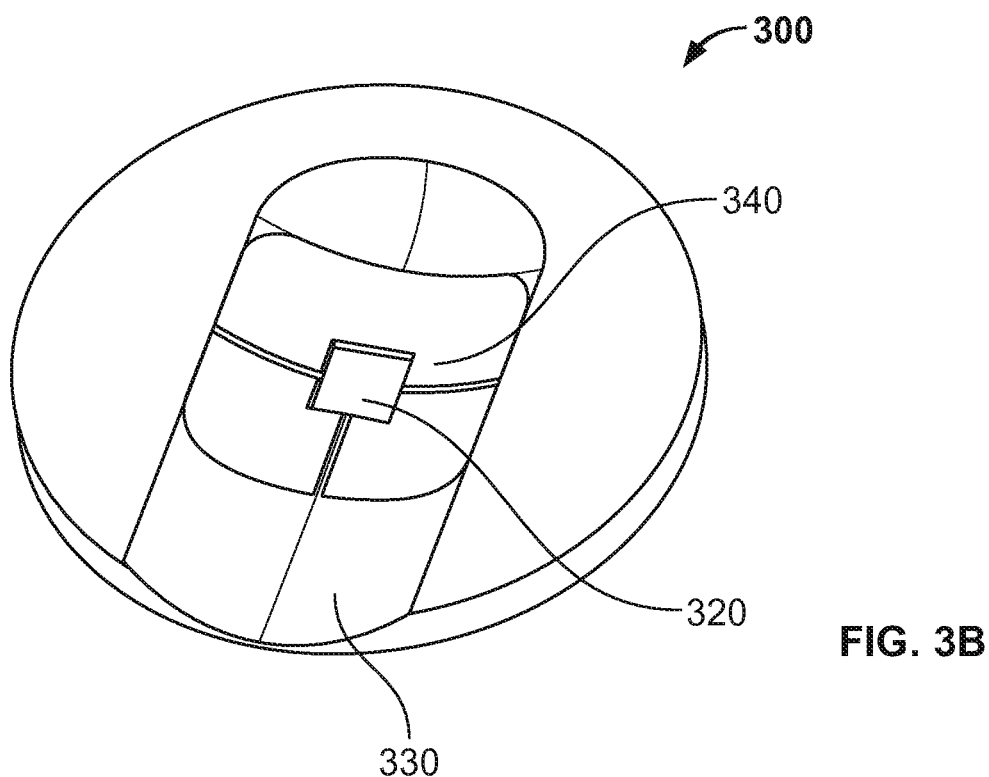
FIG. 3B is a perspective view of the capacitive push-to-start switch of FIG. 3A, according to an illustrative embodiment.
Figure 4A:
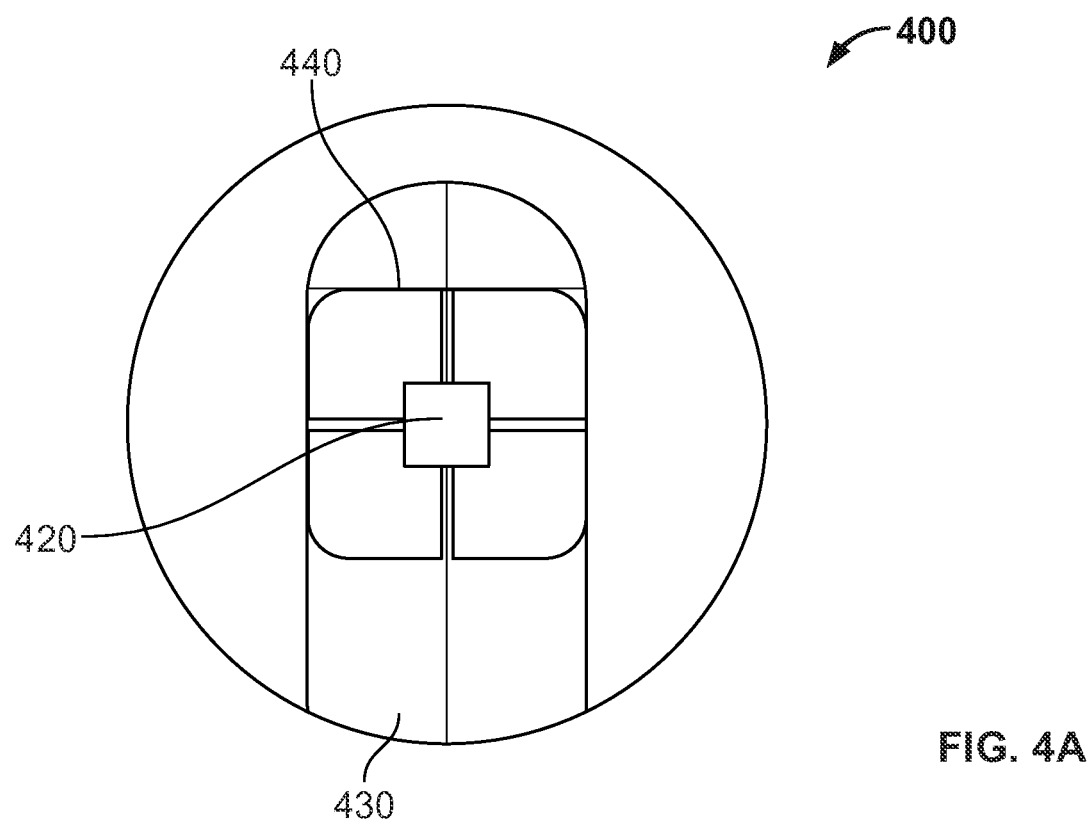
FIG. 4A is a front view of capacitive sensors for a capacitive push-to-start switch, according to an illustrative embodiment.
Figure 4B:
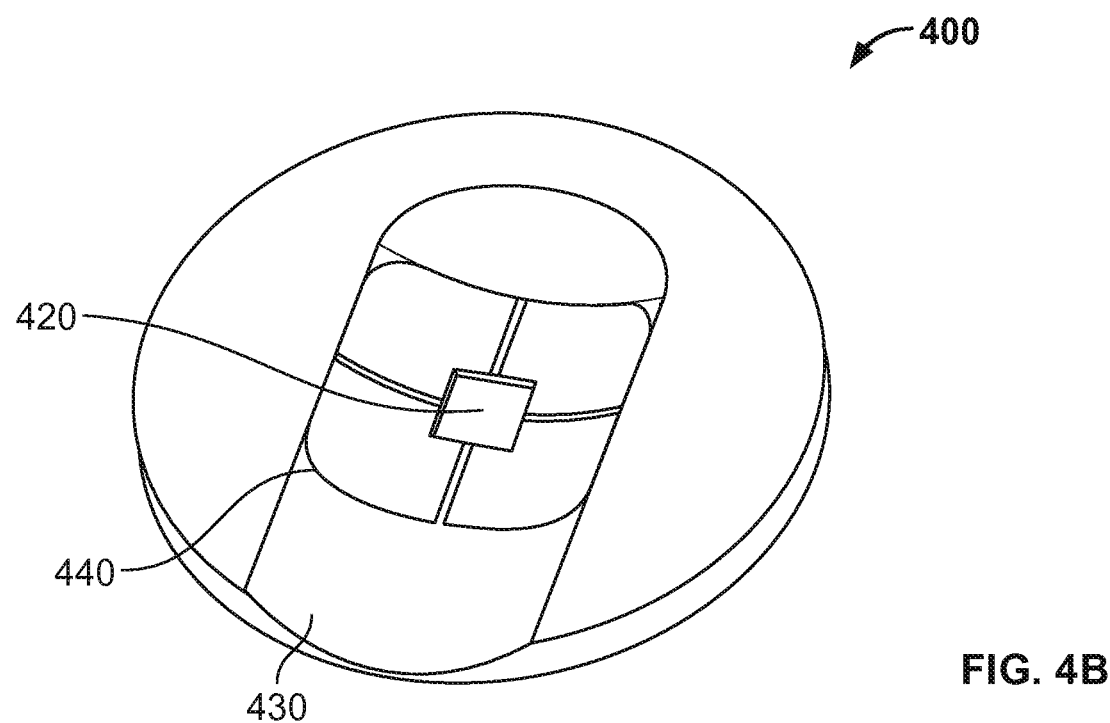
FIG. 4B is a perspective view of the capacitive push-to-start switch of FIG. 4A, according to an illustrative embodiment.

Turning to FIGS. 3A and 3B, an illustrative embodiment of a push-to-start switch 300 is shown including a measurement window 320 that is positioned in a contoured touchpad 330 and surrounded by capacitive sensors 340. In this embodiment, three capacitive sensors as well as ground planes are shown. Ground planes may be used to surround, but not touch, the capacitive sensors in order to normalize the capacitance sensor reading. Using the ground planes with the capacitive sensors provides improved measurement accuracy and repeatability. The number of capacitive sensors in the push-to-start switch may be a design decision based on cost, production efficiency, accuracy, redundancy or other factor. For example, one capacitive sensor could be used, or four as shown in FIGS. 4A and 4B. The push-to-start switch 400 includes four capacitive sensors 440 surrounding measurement window 420 all within the contoured touchpad 430.

Figure 5:
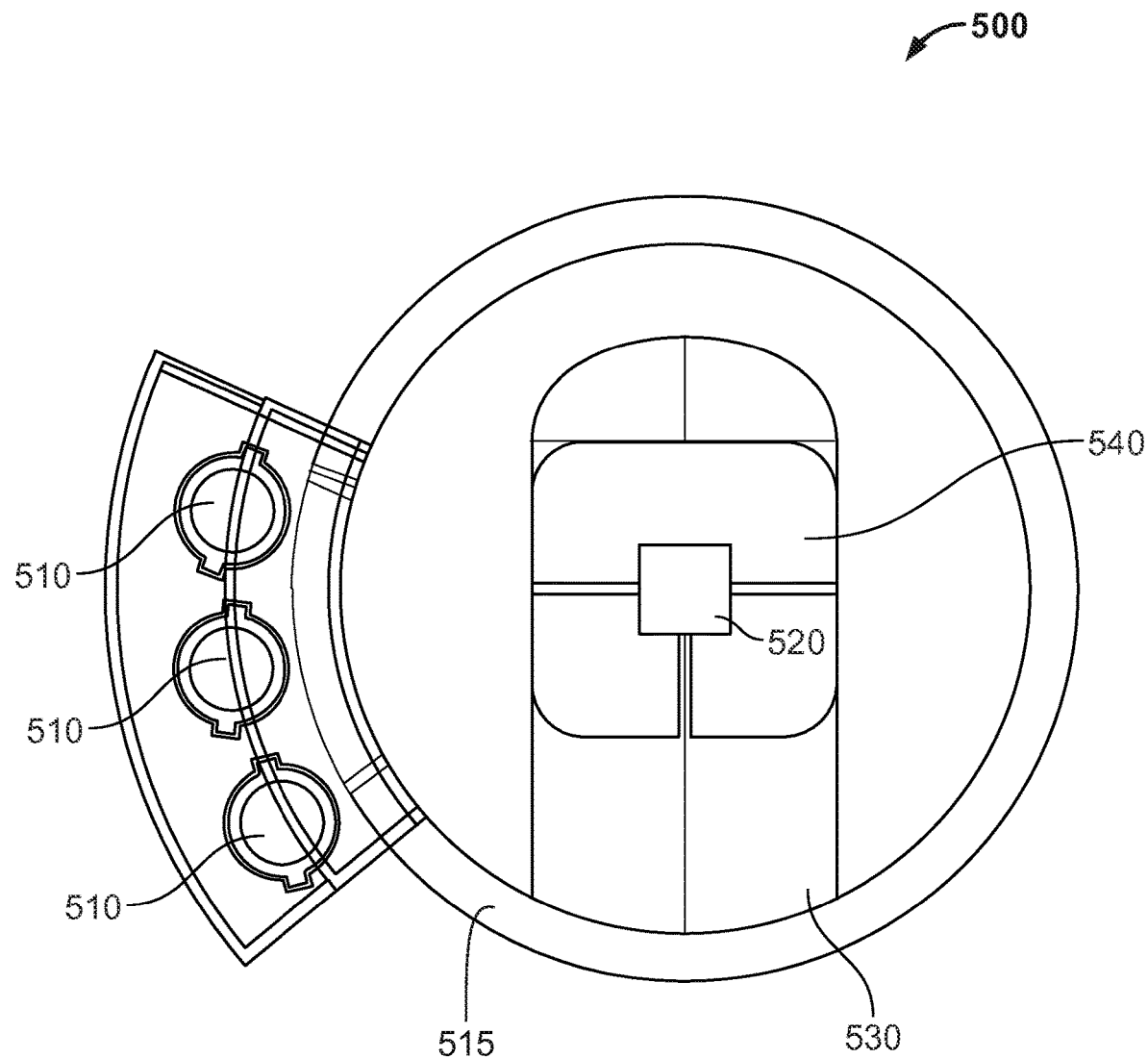
FIG. 5 is a front view of another capacitive push-to-start switch, according to an illustrative embodiment.

FIG. 5 shows an illustrative embodiment of a push-to-start switch 500 which includes several lights 510 and 515, a measurement window 520, touchpad 530 and capacitive sensors 540. As discussed herein, the lights 510 and 515 may provide visual feedback to a driver relating to finger placement as well as status of a measurement. Different numbers, types and combinations of lighted signals can be used, including one or combinations of positional, colored, flashing, strobing and rotating signals. Measurement window 520 provides a screen for a measuring device, for example a spectrometer or other device to obtain a biometric characteristic of a vehicle driver. The measurement window 520 is positioned in a contoured touchpad 530 and surrounded by capacitive sensors 540 which detect the driver's finger.

The push-to-start switches described herein can be used in any type of vehicle that can start. The vehicle can behave as any other vehicle equipped with keyless entry/start. When the driver approaches the vehicle with a push-to-start switch, it may become unlocked based on an unlocking activity, for example, a signal detected at a predefined distance, a coded entry, or other vehicle unlocking. Once the vehicle door is opened lights for the push-to-start switch may be activated so that the driver will be guided to the touchpad. Such feature may optionally only be available for night-time use.

Figure 6:
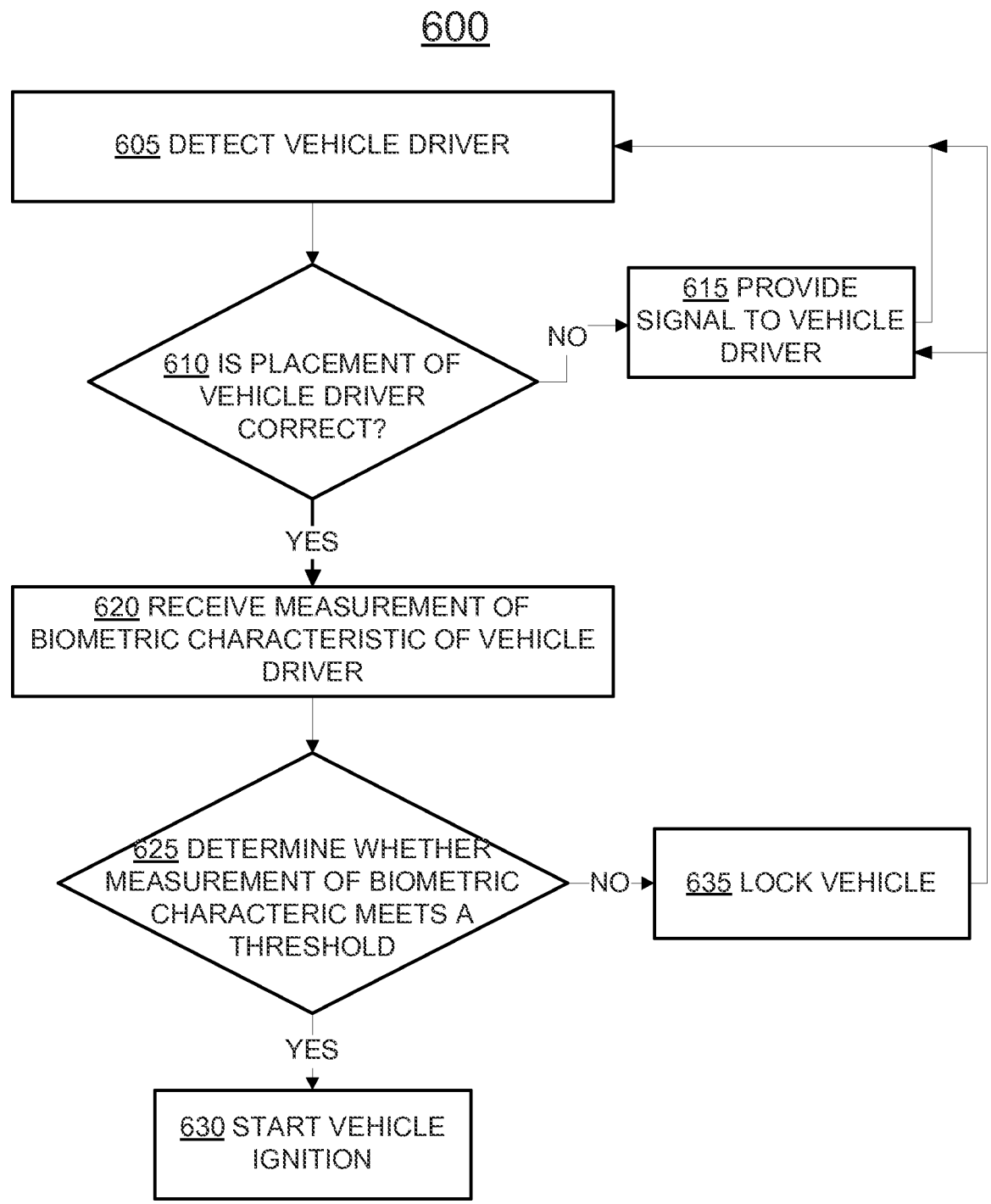
FIG. 6 is a method for using a capacitive push-to-start switch, according to an illustrative embodiment.

A method for using a push-to-start switch disclosed herein may follow the flow of FIG. 6. At 605, a vehicle driver may be detected using one or more capacitive sensors positioned in a touchpad that is contoured to fit a driver's finger. The capacitive sensors may deliver information indicating that a driver's finger has been sensed by the capacitive sensors to a controller coupled to the sensor. At 610, the processing circuitry in the controller may be used to determine whether the placement of the vehicle driver is correct. In particular, the controller may determine whether the driver's finger is positioned on the touchpad in a manner that a measurement window within the touchpad can accurately capture biometric information from the driver's finger. Ideally, the finger will be placed so that it completely covers the measurement window. Such positional information is detected by the capacitive sensors which surround the measurement window. If the placement is not correct, a signal is provide to the vehicle driver at 615. The signal may be one or more lighted indicators, audio feedback, haptic feedback or a combination thereof. The signals should guide the driver to change the finger placement and cause the sensors to re-detect the driver's finger and continue the flow at 605.

If, however, the finger placement is correct, the flow continues with a measurement of a biometric characteristic of the vehicle driver, at 620. In an embodiment, a measurement window in the touchpad will scan or sample the driver's finger and use some analysis, for example, optical or spectral, to obtain biometric information about the driver. In an example, the biometric information can be blood alcohol level. In another example, the information can be related to identity using finger prints. The measurement scan will be received by a processor which analyzes the data to determine, at 625, whether the data meets a threshold. For example, for blood alcohol level, the level can be compared against known legal standards for blood alcohol when driving, or some other predefined threshold. In another example, for a fingerprint optical analysis, the data may be matched against a database of authorized users' fingerprints.

In an embodiment, more than one type of biometric measurement may be obtained.

If the biometric characteristic measurement is determined to meet the threshold, the vehicle will start at 630. If the biometric characteristic is determined to have not met the threshold, the vehicle will lock at 635 and the driver may receive an appropriate signal indicating that the biometric characteristic measurement has failed to comply with a predefined threshold, and the flow may continue to 605 if the driver attempts to restart the switch.

In an embodiment, detection of the driver at 605 may depend on whether a person is detected in the driver's seat of the vehicle.

Although not shown, a processor or controller coupled to the push-to-start switch may be used to perform the steps of the methods described herein. Such controller may include elements of conventional computers including memory RAM and ROM, processing units CPU, communication ports that can link to the switch and other vehicle components. For example, the controller may be linked to an audio port so that audio signals can play over the vehicle audio system.

While various embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for controlling ignition of a vehicle, the system comprising:
    a measurement window for measuring a biometric characteristic of a vehicle driver, the measurement window comprising a capacitive sensor on a touchpad, the capacitive sensor capable of detecting the finger of the vehicle driver;
    a haptic actuator coupled to the touchpad; and
    a controller coupled to the measurement window and the haptic actuator and configured to:
        provide a signal to the vehicle driver indicative of whether placement of the finger on the measurement window is correct, wherein the signal comprises haptic feedback to correct the placement of the finger on the measurement window, and further wherein the haptic feedback comprises movement to physically nudge the finger of the vehicle driver in a particular direction so as to physically move the finger of the vehicle driver relative to the measurement window, whereby to correct the placement of the finger on the measurement window for an accurate biometric measurement;
        when the placement of the finger is correct, receive a measurement from the measurement window of the biometric characteristic of the vehicle driver;
        determine whether the measurement of the biometric characteristic of the vehicle driver meets a predetermined threshold; and
        control starting the vehicle based on the measurement of the biometric characteristic of the vehicle driver.

2. The system of claim 1 wherein the haptic actuator is configured to simulate a push-to-start button when the vehicle starts.

3. The system of claim 1 wherein the signal to the vehicle driver is indicative of how placement of the finger is correct for an accurate biometric measurement.

4. The system of claim 1 wherein the signal to the vehicle driver is indicative of how to correct error in placement of the finger.

5. The system of claim 1 wherein the signal comprises a visual indicator.

6. The system of claim 1 wherein the signal comprises an audio indicator.

7. The system of claim 1 wherein the touchpad comprises a plurality of capacitive sensors.

8. The system of claim 1 wherein the biometric characteristic comprises blood alcohol level.

9. The system of claim 1 wherein the measurement window is configured to measure more than one biometric characteristic.

10. The system of claim 1 wherein the touchpad comprises a ground plane surrounding the capacitive sensor.

11. A method for controlling ignition of a vehicle, the method comprising:

detecting a finger of a vehicle driver at a capacitive sensor on a touchpad of an ignition controller;

providing a signal to the vehicle driver indicative of whether placement of the finger on a measurement window is correct for an accurate biometric measurement, the signal comprising haptic feedback to correct the placement of the finger on the measurement window, and further wherein the haptic feedback comprises movement to physically nudge the finger of the vehicle driver in a particular direction so as to physically move the finger of the vehicle driver relative to the measurement window, whereby to correct the placement of the finger on the measurement window;

when the placement of the finger is correct, receiving a measurement from the measurement window on the touchpad of a biometric characteristic of the vehicle driver;

determining whether the measurement of the biometric characteristic of the vehicle driver meets a pre-determined threshold; and controlling starting the vehicle based on the measurement of the biometric characteristic of the vehicle driver.

12. The method of claim 11 further comprising a haptic actuator coupled to the touchpad, the haptic actuator configured to simulate a push-to-start button when the vehicle starts.

13. The method of claim 11 wherein the signal to the vehicle driver is indicative of how placement of the finger is not correct for an accurate biometric measurement.

14. The method of claim 11 wherein the signal to the vehicle driver is indicative of how to correct error in placement of the finger.

15. The method of claim 11 wherein the signal comprises a visual indicator.

16. The method of claim 11 wherein the signal comprises an audio indicator.

17. The method of claim 11 wherein the touchpad comprises a capacitive sensor.

18. The method of claim 11 wherein the touchpad comprises a plurality of capacitive sensors.

19. The method of claim 11 wherein the biometric characteristic comprises blood alcohol level.

20. The method of claim 11 wherein the measurement window is configured to measure more than one biometric characteristic.

21. The method of claim 11 wherein the touchpad comprises a ground plane surrounding the capacitive sensor.

* * * * *